Nov. 30, 1937.　　　　O. D. JENNINGS　　　　2,100,853
DISPLAY DEVICE
Filed March 4, 1937　　　　3 Sheets-Sheet 1
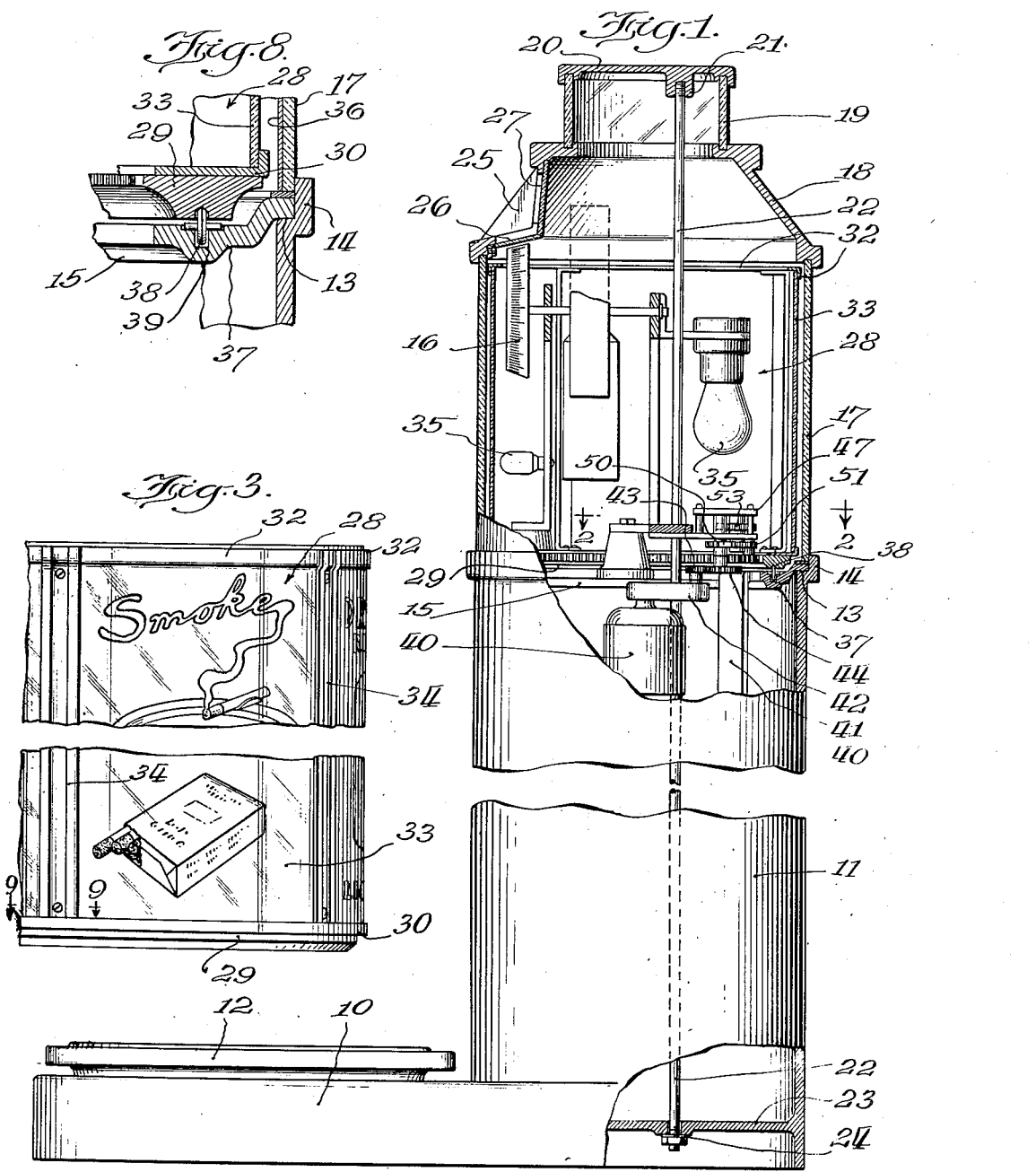

Nov. 30, 1937.  O. D. JENNINGS  2,100,853
DISPLAY DEVICE
Filed March 4, 1937  3 Sheets-Sheet 2
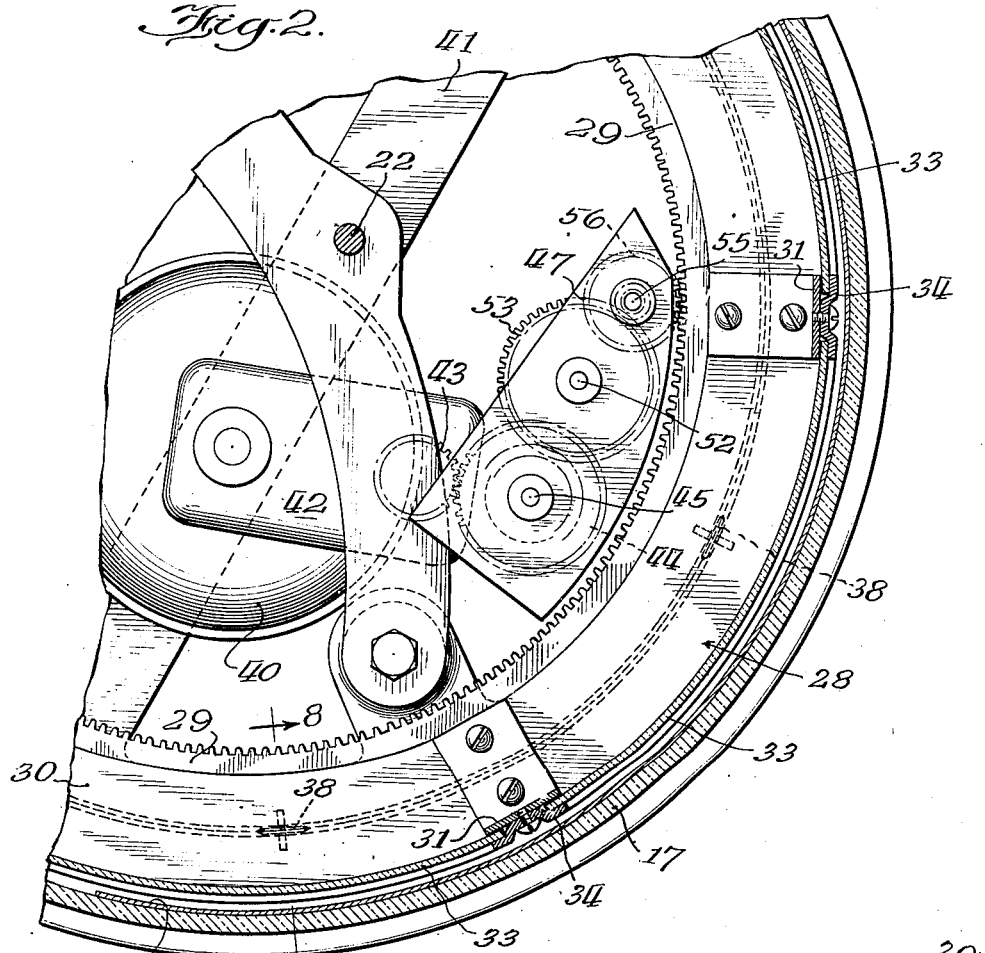
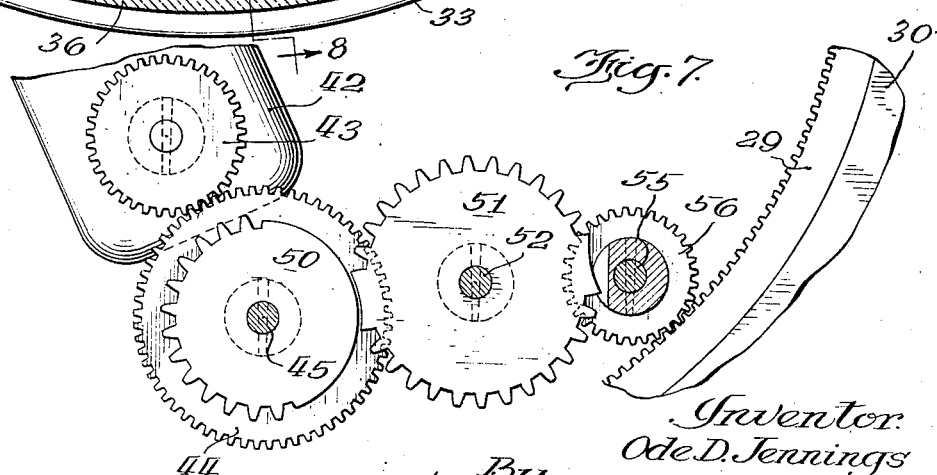

Nov. 30, 1937.　　　　O. D. JENNINGS　　　　2,100,853
DISPLAY DEVICE
Filed March 4, 1937　　　3 Sheets-Sheet 3
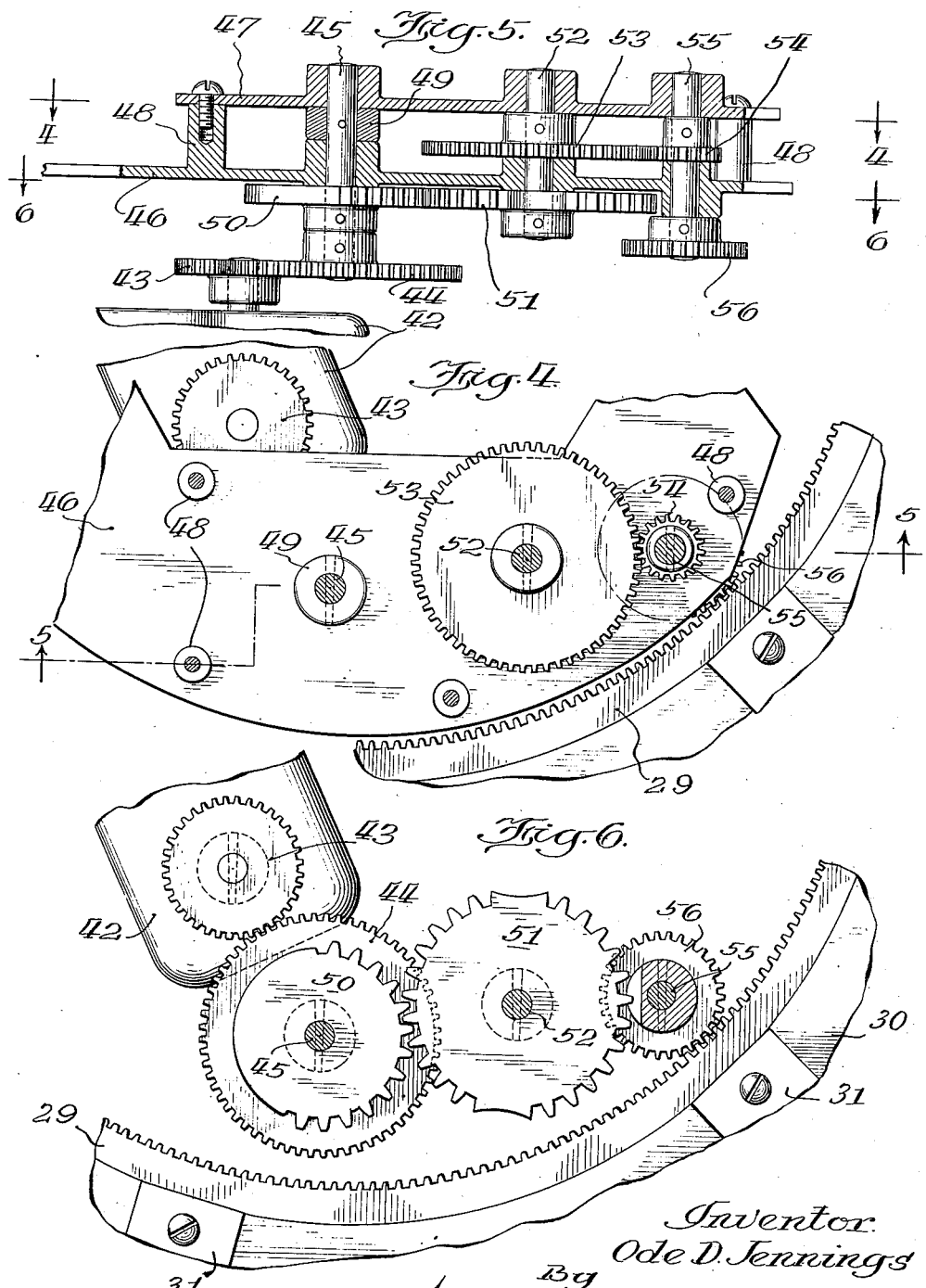

Patented Nov. 30, 1937

2,100,853

UNITED STATES PATENT OFFICE 2,100,853

DISPLAY DEVICE

Ode D. Jennings, Chicago, Ill., assignor to O. D. Jennings & Company, Chicago, Ill., a corporation of Illinois Application March 4, 1937, Serial No. 128,905

3 Claims. (Cl. 40—33)

This invention relates to a display device, which may be used, for example, for displaying advertisements in a novel and striking manner.

According to the present invention I mount the advertisements or other material which is to be displayed upon a rotatable member and I provide an intermittent drive for the rotatable member whereby it is moved to a display position and then remains arrested for a suitable interval of time for inspection by the public.

My improved display device may be embodied in many different forms. However, I prefer to embody my invention in weighing machines and other similar devices which are normally located in public places so that the displays may be viewed by a large number of people. It will, therefore, be understood that while the invention is one more particularly described in a particular embodiment in a weighing machine, it is not intended that the invention shall be limited in its application to any particular machine.

In the drawings:

Figure 1 is an elevational view of a weighing machine embodying my invention, the upper portion of the same being shown in cross-section to disclose the interior of my display device;

Fig. 2 is a fragmentary sectional plan view on a larger scale, the section being taken on the line 2—2 of Fig. 1;

Fig. 3 is a fragmentary elevational view of my display carriage;

Fig. 4 is a fragmentary sectional plan view of the mechanism for rotating the display carriage, the section being taken on the line 4—4 of Fig. 5;

Fig. 5 is a sectional view thereof, taken on the broken line 5—5 of Fig. 4;

Fig. 6 is a further sectional plan view thereof, the section being taken on the line 6—6 of Fig. 5;

Fig. 7 is a view similar to Fig. 6, showing the drive members in their position corresponding to the state of rest of the display carriage;

Fig. 8 is a fragmentary detail, taken on the line 8—8 of Fig. 2, and

Fig. 9 is a fragmentary sectional detail, taken on the line 9—9 of Fig. 3.

Referring to the drawings and more particularly to Fig. 1, the reference numeral 10 designates the base of a weighing machine which comprises a column 11 and platform 12. The column 11 is provided at its upper end with a shoulder 13 and flange 14 for the reception of a spider 15 which serves as a support for various elements of the weighing machine which are located above the column 11.

The present invention is not concerned with the mechanism of a weighing machine, but it may be noted that the same includes a weight indicator 16 and means whereby the same is supported and operated. A glass cylinder 17 is mounted within the flange 14 upon the spider 15, a suitable gasket being interposed between the cylinder and the edge of the spider. The cylinder 17 is surmounted by a dome 18 which is provided with an annular recess for the reception of a further glass cylinder 19. The glass cylinder 19 is surmounted by a closure 20. The closure 20 is provided on the inside with a boss 21 which is provided with a tapped opening for the reception of a tie rod 22. The cylinders 17 and 19 and the dome 18 are held in assembled relation upon the column 11 by means of the tie rod 22 which extends downwardly through a web 23 in the base of the machine, the rod 22 being maintained under tension by means of a nut 24. The dome 18 is provided with a recess 25 which comprises glazed openings 26 and 27. Through the opening 26 the weight indicator 16 may be viewed. The opening 27 provides for the display of any suitable reading material, for example, a card indicating normal weights corresponding to the individual's height.

The display carriage 28 is preferably substantially cylindrical in form. It may comprise a lower annular member 29 which is provided with internal teeth. To the annular member 29 is secured an annular strip 30 provided with an upturned flange. Vertical straps 31 are secured to the annular member 30 and an upper ring member 32 is carried by the straps 31 and is provided with an overhanging flange.

The displays illustrated comprise transparent panels 33 which may be of any suitable number. In the present embodiment, the display carriage 28 is intermittently turned through a quarter of a revolution and, consequently, I provide the cylindrical carriage 28 with four display panels 33. These panels may be entered under the flanges of the annular members 30 and 32 and their vertical edges may abut against consecutive vertical straps 31, as shown in Fig. 9. Preferably the same number of straps 31 are employed as display panels, in the present case four. The panels 33 are mounted on the carriage by means of exterior straps 34 which are mounted by means of screws on the straps 31. The center portions of the straps 34 are slightly depressed, as best seen in Fig. 9, so that space is provided between their lateral zones and the straps 31, for the reception of the edges of the panels 33.

Incandescent lamps 35 are provided within the display carriage 28, whereby the transparent panels may be illuminated. If desired, part of the glass cylinder 17 may be obscured by a non-transparent inner sheet 36 so that the display panels are viewed only at one opening or window of approximately the same size as the panel.

The spider 15 is provided with an annular portion 37 which supports the annular member 29. The annular portion 37 is recessed at suitable positions to provide mountings for rollers 38 which rotatably support the annular member 29. The annular member is provided with a groove 39 which receives the rollers 38 in such a manner as to maintain the carriage 28 in coaxial position with respect to the cylinder 17. The carriage 28 is driven intermittently by a motor 40. This motor may be mounted on a bracket 41 depending from the spider 15 and it may comprise a gear reduction mechanism 42 whereby a pinion 43 is driven at relatively low speed.

The pinion 43 is in mesh with the larger pinion 44 which is rigidly mounted on a shaft 45. The shaft extends upwardly through two plates 46 and 47. The plate 47 is mounted on the plate 46 by the aid of suitable spacers 48. The plate 46 is rigidly mounted on a support carried by the spider 15. The shaft 45 is rotatably mounted in bearings carried by the plates 46 and 47 and is held against axial displacement by a collar 49 which is rigidly mounted on the shaft between the two plates.

Below the plate 46 the shaft 45 has rigidly mounted thereon a driving Geneva element 50, a little more than one-half of which is provided with teeth, and the remainder amounting to a little less than one-half is plain. The teeth of the driving Geneva element 50 mesh with the teeth of a driven Geneva element 51. This driven Geneva element comprises two consecutive portions which are adapted to engage the plain portion of the driving Geneva element 50 during approximately one-half a turn, the driven Geneva element 51 remaining stationary after each half turn of the shaft 52 on which it is rigidly mounted. The shaft 52 extends through bearings in the plates 46 and 47 and is prevented from longitudinal movement by means of the pinion 53 mounted between these plates. The pinion 53 meshes with a pinion 54 which is rigidly mounted between the plates 46 and 47 on a shaft 55, which shaft has bearings in these plates. The lower portion of the shaft 55 projects downwardly below the plate 46 and rigidly carries a pinion 56 which meshes with the teeth on the inner side of the annular member 29.

The gear reduction provided by the gears mentioned and by the element 42 is appropriate to permit the carriage 28 to be rotated through one-quarter revolution and then to stand still for sufficient time to enable the observer to consider the advertising on the panel presented to him. In the present embodiment it will be understood that the motor 40 operates continuously and that the time for movement to bring a new panel into position is approximately the same as the period of rest during which the displayed panel is presented to view.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. A display device including a column having a section consisting of a glass cylinder, a cylindrical display carriage rotatably mounted within said cylinder, illuminating means within the display carriage, means supporting said carriage for rotation, a motor and Geneva elements for rotating said carriage step by step, and a plurality of transparent or translucent displays mounted on said carriage.

2. A display device including a column having a section consisting of a glass cylinder, a cylindrical display carriage rotatably mounted within said cylinder, an internal gear carried on said carriage, illuminating means within the display carriage, means supporting said carriage for rotation, a motor, Geneva elements driven thereby, a pinion intermittently actuated thereby in mesh with said internal gear, whereby said carriage is rotated step by step, and a plurality of transparent or translucent displays mounted on said carriage.

3. A display device including a column having a section consisting of a glass cylinder, a cylindrical display carriage rotatably mounted within said cylinder, an internal gear carried on said carriage, illuminating means within the display carriage, roller supporting means located around the periphery of the carriage to enable it to be rotated, a motor, Geneva elements driven thereby, a pinion intermittently actuated thereby in mesh with said internal gear, whereby said carriage is rotated step by step, and a plurality of transparent or translucent displays mounted on said carriage.

ODE D. JENNINGS.